United States Patent Office 3,506,927
Patented Apr. 14, 1970

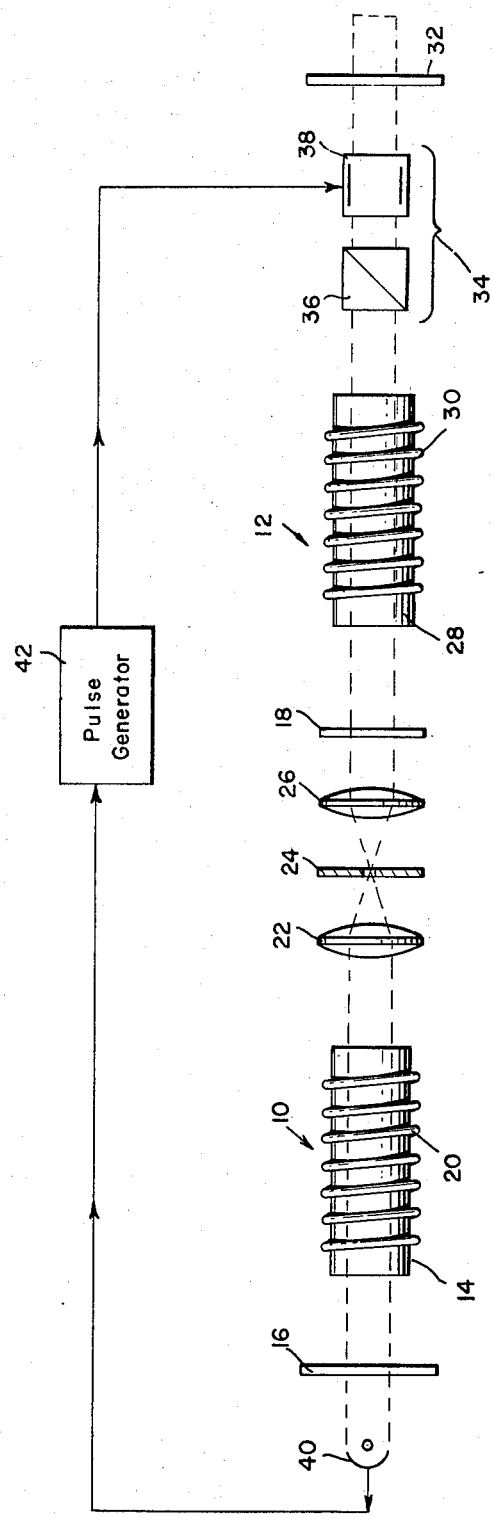

3,506,927
SELECTED MODE GIANT PULSE LASER
Robert S. Witte, Torrance, and Lee M. Frantz, Redondo Beach, Calif., assignors to TRW Inc., Redondo Beach, Calif., a corporation of Ohio
Filed Dec. 23, 1966, Ser. No. 604,432
Int. Cl. H01s 3/02
U.S. Cl. 331—94.5                                          6 Claims

ABSTRACT OF THE DISCLOSURE

Single mode operation is achieved from a giant pulse laser by enhancing oscillations in the desired mode group rather than inhibiting oscillations in the undesired modes. Enhancement of oscillations in the desired mode group is achieved by injecting a signal of the desired mode group into a cavity that sustains multimode oscillations, such that the oscillations of the desired mode group override those of all the other modes.

---

This invention relates to giant pulse lasers and more particularly to improvements designed to cause substantially a selected mode or group of modes of the output radiation to predominate over other modes.

For applications that require a well-focussed or highly collimated intense beam of light, the provision of a giant pulse laser that operates in a single mode or a spectrally narrow mode group would prove highly desirable. Heretofore, little or no success has been achieved in producing single mode giant pulses, although single mode operation in low power lasers is readily achieved. The scheme of employing a lens and pinhole aperture in the cavity of a low power laser is not readily adaptable in high power lasers because of thermal erosion of the pinhole by the intense optical radiation. The principle utilized in the aforementioned scheme is to inhibit oscillations in the undesired modes by providing a cavity that has a high Q for the desired mode but has a low Q for the undesired modes.

According to the invention, oscillations in the undesired modes are not inhibited; but rather, the oscillations in the desired mode group are enhanced. Enhancement of oscillations in the desired mode group is achieved by injecting a signal of the desired mode group into a cavity that sustains multimode oscillations, such that the oscillations of the desired mode group override those of all the other modes.

In accordance with a preferred embodiment, a selected mode group injection signal is produced from a low power laser. A giant pulse laser is arranged to receive the injection signal from the low power laser. The giant pulse laser is pumped such that it has a high population inversion at the time the injection signal first appears and preferably before it reaches its peak amplitude. The appearance of the injection signal is sensed by a light sensitive detector which actuates a trigger circuit for switching the giant pulse laser. During the time the giant pulse laser is switched on, the injected selected mode group signal is present in the giant pulse cavity causing that preferred mode group to override all other modes to the extent that the giant pulse output energy is substantially in the desired mode group.

The single figure of the drawing is a schematic representation of a narrow spectrum giant pulse laser system according to the invention.

Referring to the drawing, there is shown a narrow spectrum low power laser 10 optically coupled to a giant pulse laser 12. The low power laser 10 includes a body 14 of active material, such as a cylindrical rod of ruby, disposed in an optical cavity comprised of mirror elements 16 and 18. One of the mirror elements 16 is preferably about 99% reflective and about 1% transmissive, while the other mirror element 18 is about 90% reflective and 10% transmissive to pass the output signal pulse generated in the lower power laser 10. A pumping means 20, such as a helical gas discharge lamp, surrounds the active body 14. Associated with the pumping means 20 is a voltage source, not shown, for supplying exciting power thereto.

Mounted along the longitudinal axis of the low power laser 10 between the active body 14 and the output mirror element 18, are a converging lens 22, a pinhole element 24, and a collimating lens 26. The lenses 22, 26 and pinhole element 24 form a mode selecting assembly which limits the output radiation from the low power laser 10 to a selected mode group having a narrow spectrum. The mode selecting means shown herein is exemplary, and other means for performing the same function may be used.

The giant pulse laser 12 includes a body 28 of active material similar in composition to that of the active body 14 of the low power laser 10. Because of the high power capabilities of the giant pulse laser, the body 28 may be larger in physical size than the first active body 14, although it need not necessarily be. The active body 28 is surrounded by a pumping means 30 also shown as a helical gas discharge lamp.

The output mirror element 18 of the low power laser 10 also serves as a mirror element for the optical cavity of the giant pulse laser 12. The mirror element 18 and a third mirror element 32 comprise the optical cavity for the giant pulse laser 12. The third mirror element 32, through which the giant output is transmitted, is about 75 to 80% reflective and 25 to 20% transmissive. The spacing between the mirror elements 18 and 32 of the giant pulse laser 12 may be equal to the spacing between the mirror elements 16 and 18 of the low power laser 10, or to some integral multiple of it, so that both laser cavities will be resonant to the same wavelength of light. All three mirror elements 16, 18, and 32 are axially aligned.

Positioned between the active body 28 and the third mirror 32 is a Q-switch 34 which serves to alter the Q of the optical cavity of the giant pulse laser 12. The Q of the cavity may be changed from an initial low value when no output is desired from the giant pulse laser 12, to a high value, at which time an output pulse may be derived from the laser 12. The Q-switch 34 may be one of conventional design. As illustrated herein, the Q-switch 34 may comprise a Glann-Thompson polarizer 36 and a Kerr cell 38.

The operation of giant pulse or Q-switched lasers has been reported in the literature. One such article is entitled "Energy Storage and Radiation Emission for Kerr-Cell-Controlled Lasers," by F. R. Marshall, D. L. Roberts, and R. F. Wuerker, published in the Bulletin of the American Physical Society, Series II, vol 7, Aug. 27, 1962, No. 7, page 445. Another article is entitled "Laser Cavity Dumping Using Time Variable Reflection," by W. R. Hook, R. H. Dishington, and R. P. Hilberg, published in Applied Physics Letters, vol. 9, page 125, dated 1966. The latter article demonstrates the capability of switching a Kerr cell assembly at a desired time.

However, a brief description of the operation of the Q-switch 34 is as follows: The Glann-Thompson polarizer 36 will transmit light of a given plane of polarization but will reflect light that is polarized 90° to that given plane. The Kerr cell 38, when a voltage is applied thereto, will rotate the plane of polarization of light passing therethrough by 45°. It is a property of the active bodies 10 and 12 that their stimulated light emission is plane polarized. This is true either by virtue of the nature of the material of the bodies or by virtue of the geometry of their end faces.

Assume light is traveling from left to right through the active body 14 and is polarized in the direction such that it will be transmitted by the Glann-Thompson polarizer 36. The Kerr cell 38 will rotate the plane of polarization of the light 45°. The light is reflected by the third mirror 32, and upon passing through the Kerr cell 38, the plane of polarization of the light is rotated another 45° so that when it reaches the polarizer 36, the plane of polarization is 90° relative to its initial polarization. Therefore the light is reflected out of the cavity by the polarizer 36. Thus, while the Kerr cell 38 is switched on, light oscillations are inhibited in the giant pulse laser 12.

When it is desired to promote oscillations in the giant pulse laser, the Kerr cell 38 is switched off. Light will pass through the Kerr cell 38 in both directions without having its polarization affected and thus will be transmitted through the polarizer 36 in both directions of cavity traversal. Oscillations can build up in the laser 12 to the extent of producing a desired output.

Generally, the switching off of the Kerr cell 38 is delayed from the initiation of the pump sources only for a time sufficient to cause the active body 28 to reach a high population inversion. In accordance with the present invention, the Kerr cell 38 is switched off at a time not only when a high population inversion is present but also when a light signal is received by the giant pulse laser 12 from the low power laser 10. To this end, means are provided for sensing the appearance of a light signal pulse from the low power laser 10.

The light signal pulse sensing means includes a light detector 40, such as a high-speed photomultiplier positioned next to the first mirror element 16. The light transmitted through the almost totally reflective but slightly transmissive mirror element 16 is picked up by the detector 40 which converts the light signal into an electrical signal. The electrical signal is fed to a trigger pulse generator 42 which generates the appropriate electrical pulse for switching off the Kerr cell 38.

The operation is as follows: Initially, the trigger pulse generator 42 supplies a voltage to the Kerr cell 38 which causes the latter to rotate the plane of polarization of polarized light impinging thereon in the manner above described. The Kerr cell 38 is said to be in the "on" state at this time. So long as the Kerr cell 38 is in the "on" state, the giant pulse laser 12 is inhibited from building up light oscillations and no output is generated thereby. Thus, when pumping energy is supplied to the giant pulse laser 12, the atoms of the active body 28 are raised to excited states, but no lasing action can occur because of the low Q imparted to the optical cavity by the Q-switch 34 to all oscillating modes of plane polarized light.

The low power laser 10 is not so inhibited, except that the plane polarized light is constrained to oscillate substantially in a spectrally narrow mode group, in this case a longitudinal mode group, by the assembly comprising the lenses 22, 26, and pinhole element 24. When pumping energy is supplied to the low power laser 10, oscillations can build up in the selected mode group, and in a short time a light signal pulse of this mode group is generated in the optical cavity of the laser 10. The light signal pulse from the low power laser 10 is simultaneously injected into the active body 28 of the giant pulse laser 12 and sensed by the light detector 40.

The duration of the light signal pulse between half power points is of the order of 100 nanoseconds. Within the time required for the light signal pulse to reach its peak amplitude, it is detected and the trigger pulse generator 42 is actuated to switch "off" the Kerr cell 38.

Assuming the light detector 40 is actuated when the light signal pulse reaches one half its peak power amplitude, the Kerr cell 38 is triggered "off" within 50 nanoseconds after the light detector 40 is actuated. The Hook et al. article referred to above demonstrates that such Kerr cell switching times can be achieved.

Therefore, at the time the Kerr cell 38 is switched "off," the selected mode injected signal is present within the cavity of the giant pulse laser 12. While oscillations in many different modes can now build up in the giant pulse laser 12, the presence of the injected signal causes the selected modes to override all other modes. The enhancement of these modes causes the giant pulse laser to give an output signal that is substantially in the selected mode group.

The embodiments of the invention in which an exclusive property or privilege is claimed are defined as follows:

1. In combination:
   a first laser capable of sustaining oscillations in a plurality of modes;
   a second laser providing an output signal limited substantially to one of said plurality of modes;
   means for injecting said signal from said second laser into said first laser;
   means inhibiting oscillation build-up in said first laser prior to injection of said signal from second laser into said first laser;
   and control means responsive to the initiation of said signal and operatively coupled to said inhibiting means to render the same non-inhibiting during a period when said signal is present in said first laser, thereby causing said first laser to sustain oscillations of which said one mode predominates.

2. The invention according to claim 1, wherein said lasers are axially aligned.

3. The invention according to claim 1, wherein said first laser includes an optical cavity, wherein said oscillation inhibiting means includes variable Q means in said first laser providing a Q of low value in the optical cavity thereof in the absence of said signal from said second laser, and wherein said control means is operatively coupled to said variable Q means to change the Q of said optical cavity of said first laser to a high value.

4. The invention according to claim 3, wherein said variable Q means includes a light polarizer and a Kerr cell in optical series.

5. The invention according to claim 1, and further including three axially aligned, equally spaced mirror elements forming optical cavities for said first and second lasers.

6. The invention according to claim 5, wherein said mirror elements have differing light transmissivities.

References Cited

UNITED STATES PATENTS

| | | | |
|---|---|---|---|
| 3,242,440 | 3/1966 | Koester et al. | 331—94.5 |
| 3,258,717 | 6/1966 | Katzman | 331—94.5 |
| 3,373,376 | 3/1968 | Clark et al. | 331—94.5 |
| 3,414,836 | 12/1968 | Clark et al. | 331—94.5 |

OTHER REFERENCES

Marshall et al.: Use of Electro-Optical Shutters To Stabilize Ruby Laser Operation, Proc. IRE, October 1962, p. 2108.

Hermance et al.: Ruby as a Potential Material for Sub-millimeter Maser, Proc. IEEE, vol. 53, No. 4, April 1965, pp. 400–401.

RONALD L. WIBERT, Primary Examiner

W. L. SIKES, Assistant Examiner